United States Patent [19]
Hodges et al.

[11] Patent Number: 5,932,696
[45] Date of Patent: Aug. 3, 1999

[54] SOLID PHASE PREPARATION OF AMINES

[75] Inventors: John Cooke Hodges; Andres Sergio Hernandez, both of Ann Arbor, Mich.

[73] Assignee: Warner-Lambert Company, Morris Plains, N.J.

[21] Appl. No.: 09/168,042

[22] Filed: Oct. 7, 1998

Related U.S. Application Data

[62] Division of application No. 08/965,567, Nov. 6, 1997.
[60] Provisional application No. 60/030,550, Nov. 13, 1996.

[51] Int. Cl.[6] ...................................................... C07K 1/04
[52] U.S. Cl. ...................... 530/334; 525/332.2; 554/154
[58] Field of Search ........................ 525/332.2; 554/154; 530/334

[56] References Cited

U.S. PATENT DOCUMENTS

| | | | |
|---|---|---|---|
| 5,416,193 | 5/1995 | Desai | 530/334 |
| 5,432,263 | 7/1995 | Haviv et al. | 530/345 |
| 5,652,336 | 7/1997 | Fife et al. | 530/342 |

OTHER PUBLICATIONS

S. Wang and R. Merrifield, "Preparation of a 5–Alkyloxycarbonylhydrazide Resin and Its Application to Solid Phase Peptide Synthesis", *J. Am. Chem. Soc.*, 1969, vol. 91, No. 23, pp. 6488–6491.

S. Wang, "Solid–Phase Synthesis of Protected Peptide Hydrazides. Preparation and Application of Hydroxymethyl Resin and 3–(p–Benzyloxyphenyl)–1,1–dimethylpropyloxycarbonylhydrazide Resin", *J. Org. Chem.*, 1975, vol. 40, No. 9, pp. 1235–1239.

*Primary Examiner*—Cecilia J. Tsang
*Assistant Examiner*—David Lukton
*Attorney, Agent, or Firm*—Francis J. Tinney

[57] ABSTRACT

A method for the solid phase preparation of an amine by a novel synthesis is described where a diol is monoalkylated with a chloromethyl resin followed by reaction with N,N'-carbonyldimidazole to afford a resin-bound tertiary-alkoxycarbonyl-imidazole which is subsequently N-alkylated and then sequentially treated with appropriate building blocks and reagents to afford a resin-bound amine which affords the desired amine after treatment with an acid as well as other valuable intermediates used in the process.

10 Claims, No Drawings

SOLID PHASE PREPARATION OF AMINES

CROSS REFERENCE TO RELATED APPLICATIONS

This application is a divisional of U.S. patent application Ser. No. 08/965,567, filed Nov. 6, 1997 which is regular application of Provisional Application Serial No. 60/030,550, filed Nov. 13, 1996.

BACKGROUND OF THE INVENTION

The present invention relates to a method for the solid phase synthesis of an amine, more particularly, the present invention relates to a method of synthesis of primary and secondary amines and α-amino esters useful as pharmaceutical agents.

Most of the existing resin attachment strategies used in solid phase organic synthesis (SPOS) have been determined by those specialties such as peptide, oligosaccharide, and oligonucleotide synthesis which have had the longest history in successful utilization of SPOS. For example, there are many resin attachment strategies for carboxylic acids that are attributable to solid phase peptide synthesis (Merrifield R. B., *J. Am. Chem. Soc.,* 1963;85:2149; Steward J. M., Young J. D., *Solid Phase Peptide Synthesis,* Pierce Chemical Co., Rockford, Ill. 1984:9–14). Similarly oligosaccharide chemistry has provided methods to attach alcohols to resins by forming an ether linkage (Gait M. J., ed., *Oligonuclentide Synthesis,* IRL Press, Oxford, 1984; Frechet J. M. J., in *Polymer-Supported Synthesis of Oligosaccharides,* P. Hodge and D. C. Sherrington, eds., Wiley, New York: 1980:407–34). Recently, solid phase methodology has been applied to the synthesis of a wide variety of non-oligomeric molecules (Terrett N. K., Gardner M., Gordon D. W., Kobylecki R. J., Steele J., *Tetrahedron,* 1995;51:8135; Thompson L. A., Ellman J. A., *Chem. Rev.,* 1996;96:555) but often the synthesis of such small organic molecules is restricted by the availability of linking strategies. A number of articles describing new resin linker strategies, including tetrahydro-pyranyl- (Thompson L. A., Ellman J. A., *Tetrahedron Lett.,* 1994;35:9333), silyl- (Routledge A., Wallis M. P., Ross K. C., Fraser W., *Bioorg. Med. Chem. Lett.,* 1995;5:2059; Plunkett M. J., Ellman J. A., *J Org. Chem.,* 1995;60:6006; Randolph J. T., McClure K. F., Danishefsky S. J., *J. Am. Chem. Soc.,* 1995;117:5712), sulfonyl- (Backes B. J., Virgilio A. A., Ellman J. A., *J. Am. Chem. Soc.,* 1996;118:3055; Beaver K. A., Siegmund A. C., Spear K., *Tetrahedron Lett.,* 1996;37:1145), benzyloxycarbonyl- (Pande C. S., Gupta N., Bhardwaj A., *J. Appl. Polym. Sci.,* 1995;56:1127; Hauske J. R., Dorff P., *Tetrahedron Lett.,* 1995;36:1589), and ADCC-linked solid supports (Bannwarth W., Huebscher, Barner R. W., *Bioorg. Med. Chem. Lett.,* 1996;6:1525) have been published.

The object of the present invention is the use of a resin linker to which amino groups may be anchored for solid phase syntheses of a variety of heterocyclic molecules. Desirable properties of the linker include stability to strongly basic conditions, temperatures as high as 100° C., and strong nucleophiles. Lastly, the linker should be cleaved under reasonably mild conditions.

We have found that the solid phase equivalent of a tertiary-butoxy carbonyl (t-Boc) protecting group fulfill these requirements. Thus, resin bound tertiary alcohols have been prepared by a two step synthesis from polystyrene-divinylbenzene (Wang S. S., Merrifield R. B., *J. Am. Chem. Soc.,* 1969;91:6488) and chloromethylpolystyrene-divinylbenzene (Merrifield resin) (Wang S. S., *J. Org. Chem.,* 1975;40:1235). These have been elaborated to a phenyl carbonate derivative and reacted with hydrazine to give a solid supported tert-alkoxycarbonylhydrazide which is used in the synthesis of C-terminal hydrazides of peptides. The use of these literature methods in the Boc-like anchoring of amines to solid supports has not reported, presumably because of difficulties achieving quantitative loading of amines via the tert-alkyl-phenylcarbonate moiety which is a relatively unreactive acylating agent.

SUMMARY OF THE INVENTION

Accordingly, a first aspect of the present invention is a method for the synthesis of an amine which comprises:

Step (a) treating a compound of Formula 2

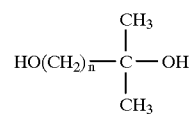

wherein n is an integer of 2 to 5 with a resin of Formula 3

wherein Ⓟ is a styrene/divinylbenzene copolymer in the presence of a base and solvent to afford a compound of Formula 4

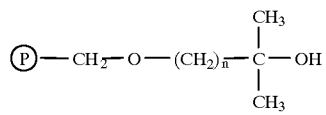

wherein Ⓟ and n are as defined above;

Step (b) treating a compound of Formula 4 with 1,1'-carbonyldiimidazole in the presence of a base and a solvent to afford a compound of Formula 5

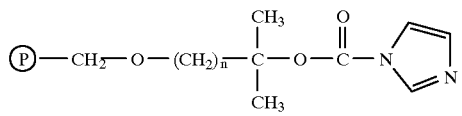

wherein Ⓟ and n are as defined above;

Step (c) treating a compound of Formula 5 sequentially with methyl trifluoromethanesulfonate (MeOTf) and a tertiary amine base in a solvent to afford in situ a compound of Formula 6

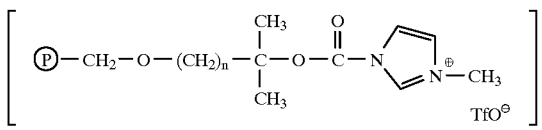

(6)

wherein Ⓟ and n are as defined above;

Step (d) sequentially adding the appropriate building blocks and carrying out the appropriate reactions to synthesize an carbamate of Formula 8

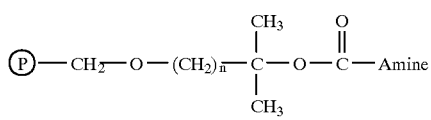

(8)

wherein Ⓟ and n are as defined above;

Step (e) treating a compound of Formula 8 with an acid in a solvent to afford an amine.

A second aspect of the present invention is a novel intermediate of Formula 4

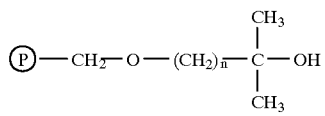

(4)

wherein Ⓟ is a styrene/divinylbenzene copolymer and n is an interger of 2 to 5.

A third aspect of the present invention is a novel intermediate of Formula 5

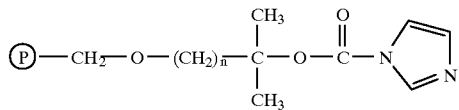

(5)

wherein Ⓟ is a styrene/divinylbenzene copolymer and n is an integer of 2 to 5.

DETAILED DESCRIPTION OF THE INVENTION

In this invention, the term "amine" means a primary or secondary aliphatic, alicyclic, aromatic, heterocyclic, or heteroaromatic amine excluding amines that cannot be protected with a tertiary butoxycarbonyl group in greater than 700 yield by reaction with one equivalent of di-tertiary butyl dicarbonate in a solution phase reaction.

"Aliphatic amine" refers to an amine containing an alkyl group wherein the term "alkyl" means a straight or branched hydrocarbon radical having from 1 to 12 carbon atoms optionally substituted with one or more carbonyl groups or carbonylalkyl groups or optionally wherein one or more of the carbon atoms is replaced with a N, S, or O atom and includes, for example, methyl, ethyl, n-propyl, isopropyl, n-butyl, sec-butyl, isobutyl, tert-butyl, n-pentyl, n-hexyl, n-heptyl, n-octyl, n-nonyl, n-decyl, undecyl, dodecyl, and the like; or an amine containing an alkenyl group wherein the term "alkenyl" means a straight or branched unsaturated hydrocarbon radical having from 2 to 12 carbon atoms and includes, for example, ethenyl, 2-propenyl, 1-butenyl, 2-butenyl, 1-pentenyl, 2-pentenyl, 3-methyl-3-butenyl, 1-hexenyl, 2-hexenyl, 3-hexenyl, 3-heptenyl, 1-octenyl, 1-nonenyl, 1-decenyl, 1-undecenyl, 1-dodecenyl, and the like; or an amine containing an alkynyl group wherein the term "alkynyl" means a straight or branched triple bonded unsaturated hydrocarbon radical having from 2 to 12 carbon atoms and includes, for example, ethynyl, 2-propynyl, 1-butynyl, 2-butynyl, 3-butynyl, 1-pentynyl, 3-pentynyl, 1-hexynyl, 2-hexynyl, 3-hexynyl, 3-heptynyl, 1-octynyl, 2-octynyl, 1-nonynyl, 2-nonynyl, 3-nonynyl, 4-nonynyl, 1-decynyl, 2-decynyl, 2-undecynyl, 3-undecynyl, 3-dodecynyl, and the like.

"Alicyclic amine" refers to an amine containing a cycloalkyl group wherein the term "cycloalkyl" means a saturated hydrocarbon ring which contains from 3 to 12 carbon atoms, for example, cyclopropyl, cyclobutyl, cyclopentyl, cyclohexyl, adamantyl, and the like; or an amine containing a cycloalkylalkyl group wherein the term "cycloalkylalkyl" means a saturated hydrocarbon ring attached to an alkyl group wherein alkyl is as defined above. The saturated hydrocarbon ring contains from 3 to 12 carbon atoms. Examples of such are cyclopropylmethyl, cyclopentylmethyl, cyclohexylmethyl, adamantylmethyl and the like.

"Aromatic amine" refers to an amine containing an aryl group wherein the term "aryl" means an aromatic radical which is a phenyl group, a benzyl group, a naphthyl group, a biphenyl group, a pyrenyl group, an anthracenyl group, or a fluorenyl group and the like, unsubstituted or substituted by 1 to 3 substituents selected from alkyl as defined above, alkoxy as defined above, thioalkoxy as defined above, hydroxy, thiol, nitro, halogen, amino,

wherein alkyl is as defined above,

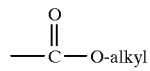

wherein alkyl is as defined above,

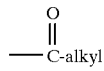

wherein alkyl is as defined above, or aryl; or an amine containing a arylalkyl group wherein an aryl group is attached to an alkyl group wherein alkyl is as defined above, for example, benzyl and the like.

"Heterocyclic amine" refers to an amine containing a cycloalkyl group wherein one or more of the carbon atoms is replaced with a N, S, or O atom, for example, 2- or 3-tetrahydrothieno, 2- or 3-tetrahydrofurano, 2- or 3-pyrrolidino, 2-, 4-, or 5-thiazolidino, 2-, 4-, or 5-oxazolidino, 2-, 3-, or 4-piperidino, N-morpholinyl or N-thiamorpholinyl, and the like; or an amine containing a cycloalkylalkyl group wherein one or more of the carbon atoms is replaced with a N, S, or O atom wherein cycloalkylalkyl is as defined above, for example, N-morpholinylethyl, and the like.

"Heteroaromatic amine" refers to an amine containing a heteroaryl group wherein the term "heteroaryl" means a heteroaromatic radical which is 2- or 3-thienyl, 2- or 3-furanyl, 2- or 3-pyrrolyl, 2-, 4-, or 5-imidazolyl, 3-, 4-, or 5-pyrazolyl, 2-, 4-, or 5-thiazolyl, 3-, 4-, or 5-isothiazolyl, 2-, 4-, or 5-oxazolyl, 3-, 4-, or 5-isoxazolyl, 3- or 5-1,2,4-triazolyl, 4- or 5-1,2,3-triazolyl, tetrazolyl, 2-, 3-, or 4-pyridinyl, 3-, 4-, or 5-pyridazinyl, 2-pyrazinyl, 2-, 4-, or 5-pyrimidinyl, 2-, 3-, 4-, 5-, 6-, 7-, or 8-quinolinyl, 1-, 3-, 4-, 5-, 6-, 7-, or 8-isoquinolinyl, 2-, 3-, 4-, 5-, 6-, or 7-indolyl, 2-, 3-, 4-, 5-, 6-, or 7-benzo[b]thienyl, or 2-, 4-, 5-, 6-, or 7-benzoxazolyl, 2-, 4-, 5-, 6-, or 7-benzimidazolyl, 2-, 4-, 5-, 6-, or 7-benzothiazolyl, unsubstituted or substituted by 1 to 2 substituents selected from alkyl as defined above, aryl as defined above, alkoxy as defined hereinafter, thioalkoxy as defined hereinafter, hydroxy, thiol, nitro, halogen, formyl, amino,

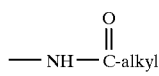

wherein alkyl is as defined above,

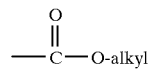

wherein alkyl is as defined above,

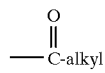

wherein alkyl is as defined above or phenyl; or an amine containing a heteroarylalkyl group wherein a heteroaryl group is attached to an alkyl group wherein alkyl is as defined above.

The terms "alkoxy" and "thioalkoxy" are O-alkyl or S-alkyl as defined above for alkyl.

The following Table 1 provides a list of abbreviations and definitions thereof used in the present specification.

TABLE 1

| Abbreviation | Solvents and Reagents |
|---|---|
| AcOH | Acetic acid |
| AcOMe | Methyl acetate |
| Ac$_2$O | Acetic anhydride |
| BnNCS | Benzyl isothiocyanate |
| n-BuOH | n-Butanol |
| Bu$_3$SnN$_3$ | Tri-n-butyl stannyl azide |
| CDI | 1,1'-Carbonyldiimidazole |
| CH$_2$Cl$_2$ | Dichloromethane |
| DMF | Dimethylformamide |
| DMAP | 4-Dimethylaminopyridine |
| 1,2-DCE | 1,2-Dichloroethane |

TABLE 1-continued

| Abbreviation | Solvents and Reagents |
|---|---|
| (iPr)$_2$EtN | Diisopropylethylamine |
| HCl | Hydrochloric acid |
| KOH | Potassium Hydroxide |
| KO$^t$Bu | Potassium tert butoxide |
| Merrifield Resin | Chloromethylated divinylbenzene cross-linked polystyrene i.e., 1% to 2% divinylbenzene cross-linked |
| MeOH | Methanol |
| MeI | Methyl iodide |
| MeLi | Methyl lithium |
| MeOTf | Methyl trifluoromethanesulfonate (Methyl triflate) |
| MeNO$_2$ | Nitromethane |
| N$_2$ | Nitrogen |
| NH$_2$NH$_2$ | Hydrazine |
| PH(CH$_2$)$_3$I | 1-Iodo-3-Phenylpropane |
| PhCH$_2$CN | Phenylacetonitrile |
| Py | Pyridine |
| THF | Tetrahydrofuran |
| TFA | Trifluoroacetic acid |
| Et$_3$N | Triethylamine |
| H$_2$O | Water |
| Ⓟ | Styrene/divinylbenzene copolymer |

The present invention discloses a homologous series of novel resins (5, n=5, 4, 3, and 2) for anchoring of amines by tert-alkoxycarbonylation. These resins are conveniently prepared in two steps from Merrifield resin and are stable to long-term storage. In situ activation by stepwise sequential treatment with MeOTf and a tertiary amine base such as, for example, Et$_3$N and the like allows anchoring of a wide variety of amines to a polymeric support for further solid phase synthesis. Subsequent sequential addition of suitable building blocks and reagents under suitable reaction conditions affords the synthesis of the desired amines. Cleavage of the amines is readily accomplished under acidic conditions which are reasonably mild. The slightly different behavior of each homolog could make more convenient the use of one or another depending on the nature of the loading amine and the synthetic sequence involved. The commercial availability of 3-methyl-1,3-butanediol (2, n=2) and relative ease of removal of linker fragments after cleavage generally make $5_{(n=2)}$ the preferred resin within the series.

The process of the present invention in its first aspect is outlined in Scheme 1.

Thus, regiospecific monoalkylation of diols 2a–d by Merrifield resin (1% to 2% divinylbenzene cross-linked) is a simple, one step approach to the synthesis of support bound tertiary alcohols that provides a range of carbon chain lengths between the linking functionality and the polymeric support. Thus, 6-methyl-1,6-heptanediol (2, n=5) (Buendia J., *Bull. Soc. Chim. Fr.,* 1966;9:2778), 5-methyl-1,5-hexanediol (2, n=4) (Lehmann J., Marquardt N., *Liebigs Ann. Chem.,* 1988:827), and 4-methyl-1,4-pentanediol (2, n=3) (Lehmann J., Marquardt N., *Synthesis,* 1987:1064) are prepared by the addition of excess MeLi to the appropriate lactone (1, n=5, 4, or 3) and 3-methyl- 1,3-butanediol (2, n=2) is obtained commercially. Treatment of each diol with an equimolar amount of potassium t-butoxide generates the corresponding monoalkoxides which are alkylated by Merrifield resin (3) to yield a homologous series of solid supported t-alkanols (4, n=5, 4, 3, or 2). Loading was verified by elemental analysis which, within experimental error (±0.4% Cl), is consistent with nearly quantitative loss of Cl. Attempted acetylation (Ac$_2$O/pyridine) of 4$_{(n=4)}$ affords a polymer which does not display a carbonyl stretch in its infrared (IR) spectrum, providing strong evidence for regiospecific reaction of Merrifield resin with the primary alcohol. Significant resin cross-linking is not suspected with any of these diols based upon results with subsequent reactions.

Reaction of 4 with N,N'-carbonyldiimidazole (CDI) and 4-(dimethylamino)pyridine (DMAP) affords the resin-bound tert-alkoxycarbonyl imidazole 5, as verified by nitrogen analysis and the presence of a carbonyl absorption in the IR spectrum at 1750 cm$^{-1}$. Confirmation of the level of acylation was afforded by the amount of imidazolium trifluoroacetate obtained upon cleavage with 10% TFA/CH$_2$Cl$_2$. In general, the reaction with CDI is efficient but not quantitative. Repeating the reaction does not significantly enhance the nitrogen content of the resin or increase the amount of imidazolium trifluoracetate recovered upon cleavage. The support-bound tert-alkoxycarbonyl imidazoles (5) are stable polymers but also poor tert-alkoxycarbonylating reagents. For example, 5$_{(n=4)}$ does not acylate leucine methyl ester under a variety of conditions, including those reported for the preparation of resin bound benzyl carbamates (N-methyl-morpholine, 60° C., 4 hours) (Hauske J. R., Dorff P., *Tetrahedron Lett.*, 1995;36:1589).

The N-alkylation of imidazolides is known to greatly enhance their reactivity as acyl transfer agents (Watkins B. E., Kiely J. S., Rapoport H., *J. Am. Chem. Soc.*, 1982;104:5702; Saha A. K., Schultz P., Rapoport H., *J. Am. Chem. Soc.*, 1989;111:4856; O'Connell J. F., *J. Org. Chem.*, 1992;57:4775). Existing literature discloses the use of methyl trifluoromethane sulfonate (MeOTf) as alkylating reagent, and THF (O'Connell J. F., Rapoport H., *J. Org. Chem.* 1992;57:4775) or MeNO$_2$ (Saha A. K., Schultz P., Rapoport H., *J. Am. Chem. Soc.*, 1989;111:4856) as solvent. Tetrahydrofuran was initially the solvent of choice due to its better resin swelling properties. Treatment of 5$_{(n=4)}$ with MeOTf (300 mol %) for 30 minutes at 10° C. generates the corresponding resin bound tert-alkoxycarbonyl(3-methyl-imidazolium) triflate 6$_{(n=4)}$, which is reacted in situ with amines to produce resin bound tert-alkyl carbamates (8). Cleavage (10% TFA/CH$_2$Cl$_2$) of 8d$_{(n=4)}$ and removal of solvents in vacuo returned the starting amines as their TFA salts with no contamination by imidazolium trifluoroacetate. Alternatively, 1,2-dichloroethane (DCE) can be used in place of THF. When DCE is used, the amount of MeOTf is reduced to 170 mol % and the remaining excess is quenched with Et$_3$N (500 mol %) prior to addition of the primary amine (600 mol %). Therefore, sequential treatment of a suspension of 5 in DCE with MeOTf, followed by Et$_3$N, followed by an amine is the preferred method for preparation of 8.

The length of the carbon chain between the benzylic ether and carbamate groups in 8 affects the ease of isolation of amine salt upon cleavage (Table 2). Treatment of a homologous series (n=5, 4, 3, and 2) of 8d with 10% TFA/CH$_2$Cl$_2$ and concentration of the filtrate at reduced pressure gives crude 7d·TFA. Examination of these crude products by Proton Nuclear Magnetic Resonance Spectroscopy ($^1$H NMR) shows the presence of contaminating linker fragments with the higher three homologs (n=5, 4, and 3) whereas pure 7d·TFA is observed with the lowest homolog (n=2). With the homologs where n=4 and 3, these linker fragments are sufficiently volatile so as to be removed by more rigorous vacuum drying at room temperature. Similar conditions did not permit the ready removal of linker fragments with the highest homolog (n=5). Identities of these linker fragments have not been conclusively established but $^1$H NMR spectra of these crude product mixtures suggest that some of the extraneous signals can be accounted for by the presence of cyclic ethers resulting from the intramolecular participation of the benzylic oxygen atom in the cleavage. Interestingly, the hydroxy group of 7d does not participate in the cleavage, since neither bicyclic urethane nor ether analogs of 7d are observed by $^1$H NMR. Moreover, acetylation (Ac$_2$O/Py) of support-bound tert-alkyl carbamate 8d$_{(n=4)}$ followed by cleavage provided 9 as the only product; therefore, 6$_{(n=4)}$ preferentially reacts with an amino group in the presence of a hydroxy group (Scheme 2).

Table 3 exemplifies the solid phase anchoring of a variety of amines and a-amino acid esters by reaction with 6$_{(n=2\ or\ 4)}$ using this strategy. Primary and secondary amines 7a–d react efficiently with 6$_{(n=2\ or\ 4)}$, affording nearly quantitative conversion to 8a–d in 3.5 hours, regardless of the linker length. The efficiency of coupling was determined by the mass of amine salt recovered after TFA cleavage. It is noteworthy that the shortest linker (n=2) consistently requires longer TFA treatment (4.5 hours) than any of the longer homologs (≦3 hours) to complete the cleavage reaction. Tertiary amino, hydroxy, and ether groups present in 7a–d are compatible with the coupling conditions. The secondary aniline 7e, being less nucleophilic and more sterically hindered, defines a limitation in the ability of 6 to anchor amines. In this case the shorter linker (n=2) appears to afford superior anchoring of 7e as compared to the longer linker (n=4), a fact that may be related to increased stability of 6$_{(n=2)}$ as compared to 6$_{(n=4)}$ during the longer coupling time employed (≦7 hours).

The HCl salts of 7f–g were neutralized in situ with Et$_3$N prior to coupling with 6$_{(n=4\ or\ 2)}$. An intermediate coupling time of 5.5 hours gives excellent yields of the TFA salts upon cleavage. Methionine ethyl ester (7h) gives a 4:1 mixture of 7h·TFA and 10 (Scheme 3) upon cleavage of 8h$_{(n=2)}$ whereas only 7h TFA was obtained from the longer homolog, 8h$_{(n=4)}$. Acid catalyzed cleavage of 3-methyl-2-butenoxymethyl resin to generate an allylic carbocation which is quenched by the thioether, is a likely explanation for the formation 10. The lack of such a sulfonium impurity from 8h$_{(n=4)}$ is likely the result of the cyclic ether formation discussed previously. The use of a 3 M HCl solution that is prepared from acetyl chloride and DCM/MeOH (3:2) for cleavage eliminates the sulfonium byproduct, affording 7h.HCl upon evaporation.

Schemes 4 and 5 depict the synthesis of a heteroaromatic and heterocyclic amine using the method of the present invention.

The starting resin bound tertiary alkyl carbamates in Schemes 2 to 5 i.e., 8d, 8h, 8f, and 13 are prepared using methodology similar to that disclosed in Scheme 1.

The following nonlimiting examples illustrate the inventors' preferred method for preparing compounds of the present invention.

SCHEME 1
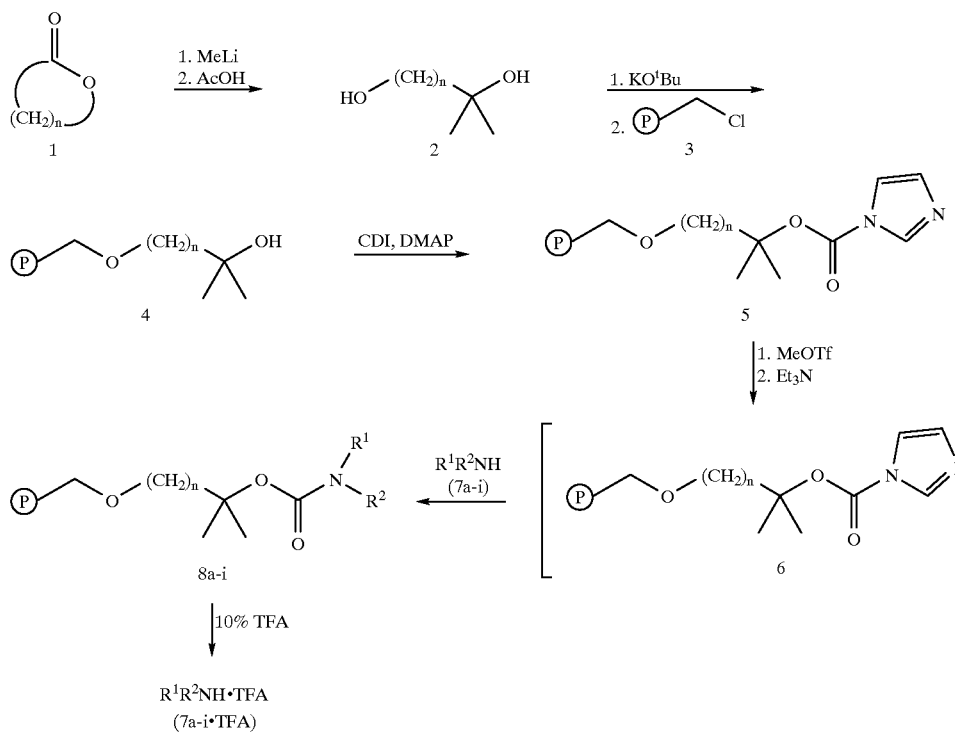
SCHEME 2
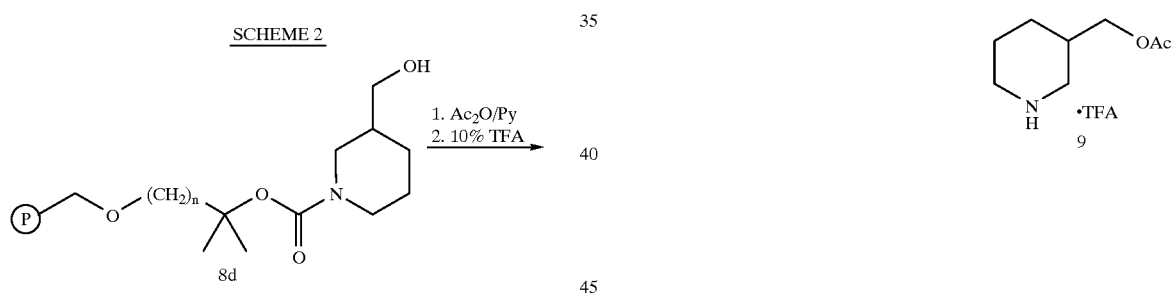
SCHEME 3
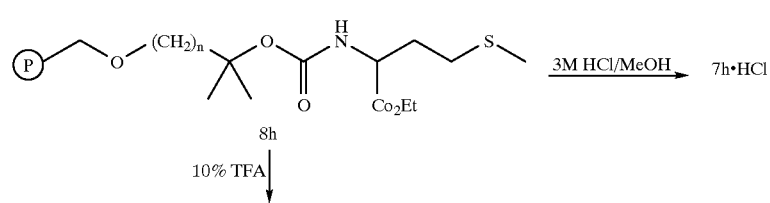

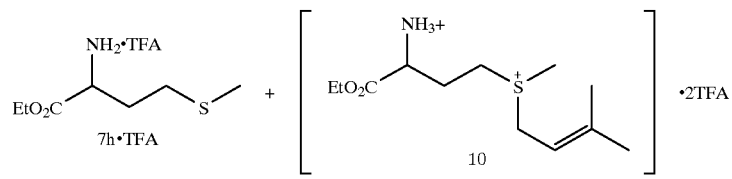
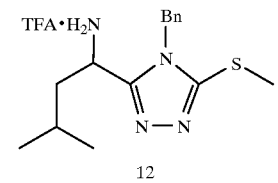
SCHEME 4
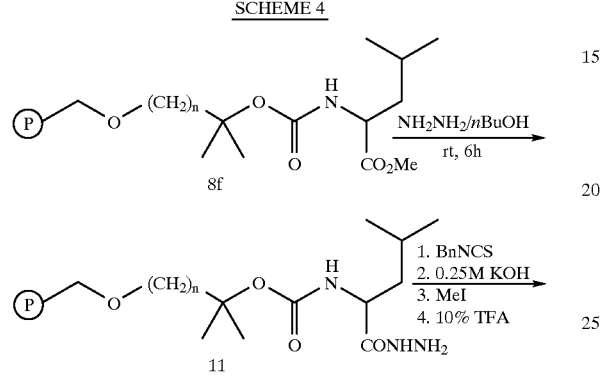
SCHEME 5
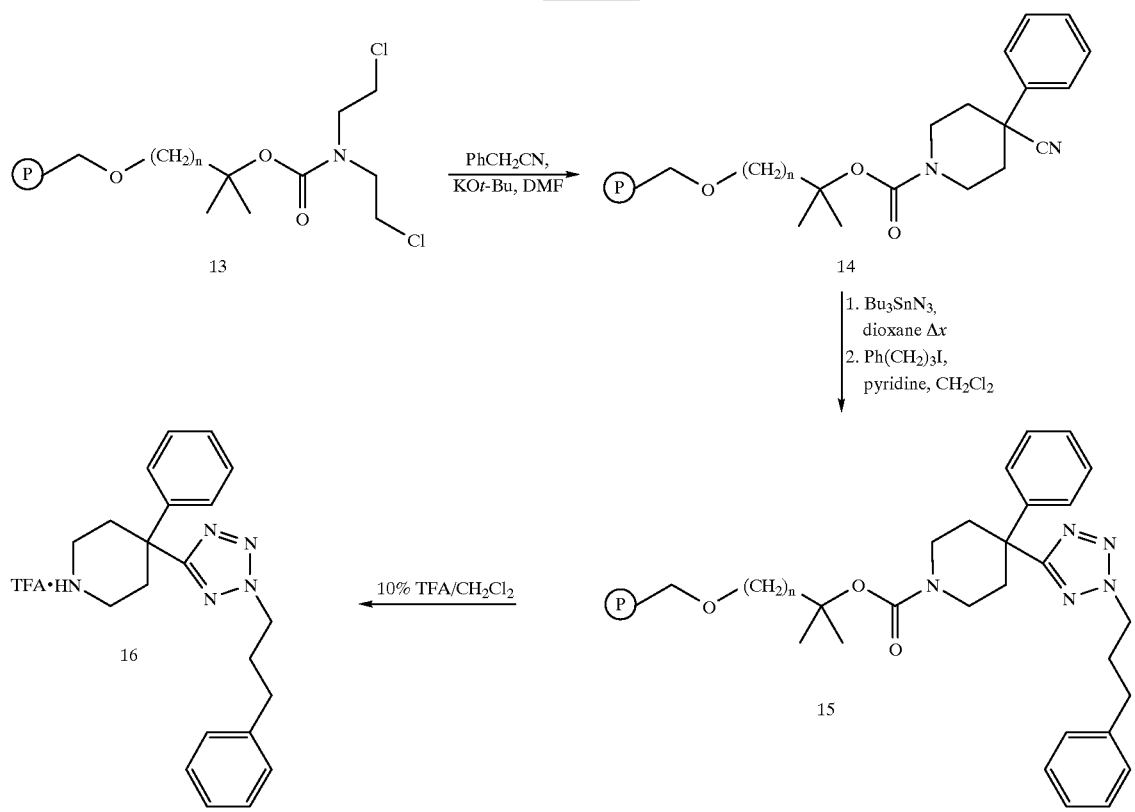

TABLE 2

Variables Depending on the Alkyl Chain, n

| Alkyl Chain, n | Removal Conditions for the Linker Fragments from 7d.TFA |
|---|---|
| 5 | Vacuum (2.5 mm Hg), 15 hours. A fragment remains. |
| 4 | Vacuum (2.5 mm Hg), 15 hours. |

TABLE 2-continued

Variables Depending on the Alkyl Chain, n

| Alkyl Chain, n | Removal Conditions for the Linker Fragments from 7d.TFA |
|---|---|
| 3 | Vacuum (2.5 mm Hg), 2 hours. |
| 2 | Not required |

TABLE 3 tert-Alkoxycarbonylation of Amines 7

| Amine 7 | Alkyl Chain, n | % N | mmol N/g | 8 mmol/g of cleaved amine |
|---|---|---|---|---|
| 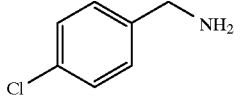 7a | 4<br>2 | 0.79<br>1.22 | 0.56<br>0.87 | 0.59<br>0.85 |
| 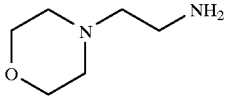 7b | 4<br>2 | 0.48<br>2.19 | 0.53<br>0.78 | 0.57<br>0.76 |
| 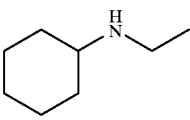 7c | 4<br>2 | 1.01<br>1.25 | 0.68<br>0.88 | 0.68<br>0.84 |
| 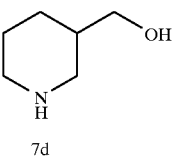 7d | 4<br>2 | 0.96<br>1.19 | 0.69<br>0.85 | 0.69<br>0.89 |
| 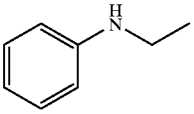 7e | 4<br>2 | 0.56<br>1.00 | 0.40<br>0.71 | 0.29<br>0.68 |
| 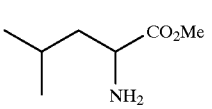 7f | 4<br>2 | 0.78<br>1.11 | 0.55<br>0.79 | 0.59<br>0.86 |
| 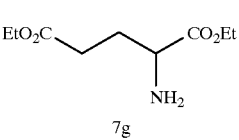 7g | 4<br>2 | 0.89<br>1.18 | 0.63<br>0.83 | 0.51<br>0.77 |

TABLE 3-continued tert-Alkoxycarbonylation of Amines 7

| Amine 7 | Alkyl Chain, n | % N | mmol N/g | 8 mmol/g of cleaved amine |
|---|---|---|---|---|
| 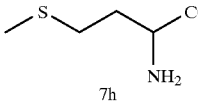 7h | 4<br>2 | 0.92<br>1.12 | 0.66<br>0.80 | 0.60<br>0.76[a] |
| 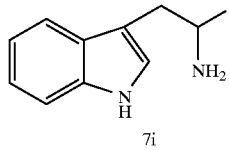 7i | 4<br>2 | 1.57<br>2.07 | 0.56<br>0.74 | 0.50<br>0.69 |

[a]Cleavage conditions: 3 M $HCl/CH_2Cl_2$, MeOH, AcOMe

EXAMPLE 1

General Procedure for the Preparation of Diols ($2_{(n=5)}$) (Buendia J., *Bull. Soc. Chim. Fr.,* 1996;9:2778), $2_{(n=4)}$ (Lehmann J, Marquardt N. *Liebigs. Ann. Chem.,* 1988:827), and $2_{(n=3)}$ (Lehmann J, Marquardt N. *Synthesis,* 1987:1064)

A 1.4M MeLi/diethyl ether solution (250 mol %) was added to a solution of lactone 1 (100 mol %) in dry THF (1.7 mL/mmol) cooled to −78° C. The mixture was stirred for 30 minutes at −78° C. and for 6 hours while warming to room temperature. Acetic acid (250 mol %) was added, and the suspension was stirred overnight at room temperature. After filtration, the filter cake was rinsed with THF, and the filtrates evaporated to give the crude diol 2 which was purified by vacuum distillation.

EXAMPLE 2

General Procedure for the Preparation of Resin-bound Tert-alkanols (4)

A 1M KO$^t$Bu/THF (300 mol %) solution was added to a solution of the diol 2 (300 mol %) in dry THF (2.5 mL/mmol), cooled to 0° C. The solution was stirred at 0° C. for 45 minutes and for 3 hours while warming to room temperature. Merrifield resin (100 mol % of chlorine sites, L=1.35 mmol/g) was added and the suspension shaken for 3.5 days at room temperature. After filtration, the resin-bound tert-alkanol 4 was washed with THF (4 times), 1/1 DMF/$H_2O$ (2 times), DMF (2 times), 1/1 DMF/$H_2O$ (2 times), DMF (2 times), THF (2 times), $CH_2Cl_2$ (2 times), and dried. Analysis showed that Cl was absent.

EXAMPLE 3

General Procedure for the Preparation of Resin-bound Tert-alkoxycarbonyl-imidazole (5)

DMAP (50 mol %) and CDI (400 mol %) were added to a suspension of the resin 4 (100 mol % of tert-alkanol sites) (The theoretical loading of tert-alkanol was calculated based upon the Cl content of the starting Merrifield resin, assuming the observed Cl displacement is due to exclusive monoalkylation by 1°-alcohol.) in dry DMF (4.5 mL/mmol). the mixture was shaken for 24 hours at room temperature and filtered. The resin-bound tert-alkoxycarbonylimidazole 5 was washed with $CH_2Cl_2$ (3 times), THF (3 times), $CH_2Cl_2$ (3 times), and dried. Analysis showed the presence of nitrogen.

EXAMPLE 4

General Procedure for the Preparation of Resin-bound Tert-alkoxycarbonyl-3-methylimidazolium Triflates (6)

Methyl triflate (170 mol %) was added to a suspension of the resin 5 (100 mol % of carbonylimidazole sites) in dry 1,2-DCE (20 mL/mmol), cooled to 10° C. The mixture was stirred for 15 minutes at this temperature and for 5 to 10 minutes while warming to room temperature. After addition of $Et_3N$ (500 mol %), stirring was continued for an additional 5 minutes and the suspension used directly as the tert-alkoxy-carbonylating/anchoring reagent.

EXAMPLE 5

General Procedure for the Preparation of Resin-bound Tert-alkyl Carbamates ($8_{(n=4)}$ and $8_{(n=2)}$) From Amines The amine 7 (600 mol %) was added neat or as a solution in $CH_2Cl_2$, to a stirred suspension at room temperature of the resin-bound tert-alkylcarbonyl (3-methyllimidazolium) triflate 6 (100 mol %) prepared as above. The mixture was shaken for 3.5 hours at room temperature and filtered. The resin-bound tert-alkyl carbamate 8 was washed with THF (3 times), 1/1 THF/MeOH (3 times), THF (3 times), $CH_2Cl_2$ (3 times), and dried.

Resin $8a_{(n=4)}$: IR 1717 $cm^{-1}$
Resin $8a_{(n=2)}$: IR 1716 $cm^{-1}$
Resin $8b_{(n=4)}$: IR 1714 $cm^{-1}$
Resin $8b_{(n=2)}$: IR 1713 $cm^{-1}$
Resin $8c_{(n=4)}$: IR 1688 $cm^{-1}$
Resin $8c_{(n=2)}$: IR 1680 $cm^{-1}$
Resin $8d_{(n=4)}$: IR 1670, 1655 $cm^{-1}$ Resin 8d$_{(n=2)}$: IR 1696, 1663 cm$^{-1}$
Resin 8e$_{(n=4)}$: IR 1698 cm$^{-1}$
Resin 8e$_{(n=2)}$: IR 1698 cm$^{-1}$

EXAMPLE 6

General Procedure for the Preparation of Resin-bound Tert-alkyl Carbamates (8$_{(n=4)}$ and 8$_{(n=20)}$) from Amino Esters.HCl Et$_3$N (600 mol %) was added to a solution/suspension of the amino ester.HCl 7.HCl (600 mol %) in CH$_2$Cl$_2$ (9 mL/mmol) and the resulting suspension filtered. The amino ester solution was transferred via syringe to a stirred suspension at room temperature of the resin-bound tert-alkoxycarbonyl-3-methyllimidazolium triflate 6 (100 mol %) prepared as above. The mixture was shaken for 5.5 hours at room temperature and filtered. The resin-bound tert-alkyl carbamate 8 was washed with THF (3 times), 1/1 THF/MeOH (3 times), THF (3 times), CH$_2$Cl$_2$ (3 times), and dried.

Resin 8f$_{(n=4)}$: IR 1717 (broad) cm$^{-1}$
Resin 8f$_{(n=2)}$: IR 1744, 1720 cm$^{-1}$
Resin 8g$_{(n=4)}$: IR 1734, 1717 cm$^{-1}$
Resin 8g$_{(n=2)}$: IR 1734 (broad) cm$^{-1}$
Resin 8h$_{(n=4)}$: IR 1733, 1716 cm$^{-1}$
Resin 8h$_{(n=2)}$: IR 1733, 1717 cm$^{-1}$
Resin 8i$_{(n=4)}$: IR 1734, 1716 cm$^{-1}$
Resin 8i$_{(n=2)}$: IR 1732 (broad) cm$^{-1}$

EXAMPLE 7

General Procedure for Cleavage of Resin-bound Tert-alkyl Carbamates (8$_{(n=4)}$ and 8$_{n=2)}$)

Resin-bound tert-alkyl carbamates 8$_{(n=4)}$ and 8$_{(n=2)}$ were treated with 10% TFA/CH$_2$Cl$_2$ (2.5 mL/100 mg of resin) for 3 and 4.5 hours, respectively, and filtered. For both types of resin, the resin was rinsed with CH$_2$Cl$_2$ (3 times), MeOH (2 times) and the filtrates evaporated and dried (vacuum, overnight) to give back amine 7, as its TFA salt. The $^1$H NMR spectra of the cleaved amines were identical to those obtained from authentic samples of ammonium trifluoroacetate 7·TFA.

EXAMPLE 8

Cleavage of Resin-bound Tert-alkyl Carbamate (8h$_{(n=2)}$)

Acetyl chloride (10.2 mL, 0.14 mol) was added to a 3/2 CH$_2$Cl$_2$/MeOH (40 mL) solution, cooled to 0° C. The resin 8h$_{(n=2)}$ (36 mg) was treated with the HCl solution (2.5 mL) for 4.5 hours and filtered. The resin was rinsed with CH$_2$Cl$_2$ (4 times), and the filtrates evaporated and dried (vacuum, overnight) to give back methionine ethyl ester (7h), as its HCl salt (8 mg). A $^1$H NMR spectrum of the cleaved ammonium hydrochloride 7h.HCl was identical to the one obtained from an authentic sample of methionine ethyl ester.HCl.

EXAMPLE 9

3-(Acetoxymethyl)piperidinium Trifluoroacetate (9·TFA) (European Patent Application, EP 468231 A2, 1992)

Acetic anhydride (0.2 mL, 2.12 mmol) was added to a suspension of the resin 8d$_{(n=4)}$ (171 mg, L=0.69 mmol/g) in pyridine (1.6 mL), and the mixture was shaken at room temperature for 24 hours. After filtration, the resin was washed with CH$_2$Cl$_2$ (3 times), THF (3 times), 1/1 THF/MeOH (3 times), THF (3 times), CH$_2$Cl$_2$ (3 times), and dried. Weight of resin: 175 mg. IR 1740, 1645 cm$^{-1}$;

Analysis Found: C, 84.14; H, 1.87, 0.98.

A portion of the resin (59 mg) was treated with 10% TFA/CH$_2$Cl$_2$ (2.5 mL) for 3 hours and filtered. The resin was rinsed with CH$_2$Cl$_2$ (3 times), MeOH (2 times), and the filtrates were evaporated and dried (high vacuum, overnight) to give 9·TFA (9.3 mg).

$^1$H NMR: δ 4.07 (dd, J=11.3, 5.2, 1H), 3.96 (dd, J=11.2, 7.2, 1H), 3.37 (2d, J=14.5, 14.1, 2H), 2.91 (dt, J=2.9, 12.7, 1H), 2.77 (t, J=12.2, 1H), 2.13 (m, 1H), 2.05 (s, 3H), 1.99–1.67 (m, 3H), 1.36 (m, 1H).

EXAMPLE 10

4-Benzyl-5-(1-amino-3-methylbutyl)-3-methylthio-1,2,4-triazole Trifluoroacetate (12)

Step (a) Resin-bound N-(tert-alkoxycarbonyl)-leucine Hydrazide (11)

To a suspension of resin-bound N-(tert-alkoxy-carbonyl)-leucine methyl ester 8f (Example 6) (L=0.72 mmol/g, 2.07 g) in n-butanol (8.0 mL) was added anhydrous hydrazine (2.0 mL) and the mixture shaken at room temperature for 6.5 hours. After filtration, the resin was washed with THF and MeOH. The last sequence of washes was repeated twice and finally the resin was rinsed with CH$_2$Cl$_2$ (3 times) and dried to give resin-bound acid hydrazide 11 (1.95 g). Analysis Found: C, 81.93; H, 7.94; N, 3.26. In order to verify completion of the reaction, a portion of the resin 11 (41 mg) was cleaved (10% TFA/CH$_2$Cl$_2$, room temperature, 4.5 hours) and filtered. The resin was rinsed with CH$_2$Cl$_2$ (3 times) and MeOH (twice). The filtrates were evaporated and dried (high vacuum, overnight) to provide leucine hydrazide·2TFA (11 mg, loading of resin 2: 0.72 mmol/g).

$^1$H NMR (CD$_3$OD): δ 1.91 (t, J=7 Hz, 1H), 1.71 (m, 3H), 0.99 (2d, J=6.2 Hz, 6H).

Step (b): 4-Benzyl-5-(1-amino-3-methylbutyl)-3-methylthio-1,2,4-triazole Trifluoroacetate (12)

The resin acid hydrazide 11 (110 mg, L=0.72 mmol/g) and a solution of benzyl isothiocyanate (57 mg, 0.38 mmol) in DMF (3.0 mL) were mixed in a peptide vessel and shaken at room temperature overnight. After draining off the solution, the resin was washed with DMF (3×2 mL), CH$_2$Cl$_2$ (3×2 mL), THF (3×2 mL), and dried. A 3/2 dioxane/0.25M KOH solution (3.0 mL) was added to the resin and the mixture heated at 60° C. to 65° C. (water bath) for 3 hours. After filtration the resin was washed with THF (3×2 mL), MeOH (3×2 mL), THF (3×2 mL), and dried. To a suspension of the resin in a 0.16M (iPr)$_2$EtN/dioxane solution (1.0 mL), was added a 0.40M MEI/dioxane solution (1.0 mL), and the mixture was shaken at room temperature for 3 hours. The reagent solution was drained off, and the resin was washed with THF (3×2 mL), MeOH (3×2 mL), THF (3×2 mL), CH$_2$Cl$_2$ (3×2 mL), and dried. The resin was treated with 10% TFA/CH$_2$Cl$_2$ (2.5 mL) at room temperature for 4.5 hours and filtered. The resin was rinsed with CH$_2$Cl$_2$ (2×3 mL), MeOH (2×3 mL), and the filtrates evaporated and dried to afford the trifluoroacetate salt of the 3-thio-1,2,4-triazole 12 (30 mg, 93% yield from resin 11).

$^1$H NMR (CD$_3$OD): δ 7.39 (m, 3H), 7.13 (d, J=7.6 Hz, 2H), 5.32 (s, 2H), 4.46 (t, J=7.2 Hz, 1H), 2.72 (s, 3H), 1.72 (t, J=7.3 Hz, 2H), 1.43 (m, 1H), 0.77 (d, J=6.5 Hz, 3H), 0.63 (d, J=6.6 Hz, 3H), MS (m/z) 291 (MH$^+$).

EXAMPLE 11

5-(4-Phenylpiperidin-4-yl)-2-(3-phenylpropyl)-2H-tetrazole Trifluoroacetate (16)

Step (a): Resin-bound 4-cyano-4-phenylpiperidine (14)

A suspension of resin-bound bis(2-chloroethyl)-amine 13 (110 mg, 0.075 mmol) in DMF (2 mL) is treated with phenylacetonitrile (20 mg, 0.17 mmol) and mixed. A 1N solution of potassium tert-butoxide in THF (0.34 mL, 0.34 mmol) is added, and the reaction is shaken at room temperature for 24 hours. The resin is filtered and washed successively with DMF, H$_2$O, MeOH, DMF, CH$_2$Cl$_2$, MeOH, CH$_2$Cl$_2$, and MeOH. It is then dried in vacuo at 50° C. for 24 hours to afford 14.

Step (b): Resin-bound 5-(4-phenylpiperidin-4-yl)-2-(3-phenylpropyl)-2H-tetrazole (15)

A suspension of 14 (0.075 mmol) in anhydrous dioxane (2 mL) is treated with tri-n-butylstannyl azide (75 mg, 0.23 mmol) and heated at reflux under N$_2$ for 24 hours. After cooling to room temperature, the resin is filtered and washed with anhydrous dioxane (2×3 mL). It is then suspended in pyridine-CH$_2$Cl$_2$ (1:1, 2 mL) and treated with 1-iodo-3-phenylpropane (55 mg, 0.22 mmol), shaking at room temperature for 2 days. The resulting resin is filtered and washed successively with DMF, 10% aqueous citric acid solution, H$_2$O, MeOH, CH$_2$Cl$_2$, MeOH, CH$_2$Cl$_2$, hexane, and CH$_2$Cl$_2$ to afford 15.

Step (c): 5-(4-Phenylpiperidin-4-yl)-2-(3-phenylpropyl)-2H-tetrazole Trifluoroacetate (16)

The resin 15 (0.075 mmol) is treated with 10% TFA/CH$_2$Cl$_2$ (2.5 mL) at room temperature for 4.5 hours and filtered. The resin is rinsed with CH$_2$Cl$_2$ (2×3 mL), MeOH (2×3 mL), and the combined filtrates are evaporated and dried to afford 16.

We claim:

1. A method for the synthesis of an amine which comprises:

Step (a) treating a compound of Formula 2

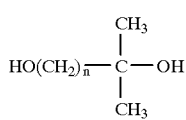

wherein n is an integer of 2 to 5 with a resin of Formula 3

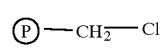

wherein Ⓟ is a styrene/divinylbenzene copolymer in the presence of a base and solvent to afford a compound of Formula 4

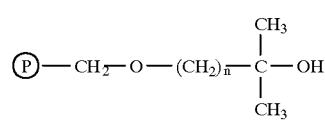

wherein Ⓟ and n are as defined above;

Step (b) treating a compound of Formula 4 with 1,1'-carbonyldiimidazole in the presence of a base and a solvent to afford a compound of Formula 5

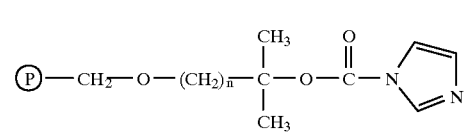

wherein Ⓟ and n are as defined above;

Step (c) treating a compound of Formula 5 sequentially with methyl trifluoromethanesulfonate (MeOTf) and a tertiary amine base in a solvent to afford in situ a compound of Formula 6

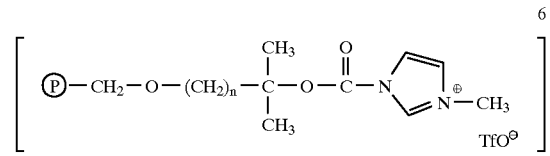

wherein Ⓟ and n are as defined above;

Step (d) sequentially adding the appropriate building blocks and carrying out the appropriate reactions to synthesize an carbamate of Formula 8

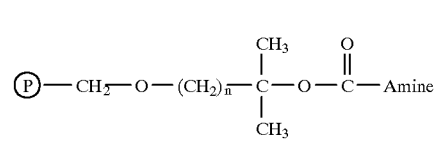

wherein Ⓟ and n are as defined above;

Step (e) treating a compound of Formula 8 with an acid in a solvent to afford an amine.

2. A method according to claim 1 wherein the resin of Formula 3 is Merrifield resin.

3. A method according to claim 1 wherein the base in Step (a) is potassium tertiary butoxide.

4. A method according to claim 1 wherein the solvent in Step (a) is tetrahydrofuran.

5. A method according to claim 1 wherein the base in Step (b) is 4-dimethylaminopyridine.

6. A method according to claim 1 wherein the solvent in Step (b) is dimethylformamide.

7. A method according to claim 1 wherein the base in Step (c) is triethylamine.

8. A method according to claim 1 wherein the solvent in Step (c) is 1,2-dichloroethane.

9. A method according to claim 1 wherein the acid in Step (e) is trifluoroacetic acid.

10. A method according to claim 1 wherein the solvent in Step (e) is dichloromethane.

* * * * *